United States Patent
Uhler

(10) Patent No.: US 6,696,961 B2
(45) Date of Patent: Feb. 24, 2004

(54) WATER DAMAGE PROTECTION SYSTEM AND METHOD OF PREVENTING WATER DAMAGE FOR DOMESTIC WATER SUPPLY SYSTEMS

(76) Inventor: Kenneth J. Uhler, 1553 Cordova Ave., Lakewood, OH (US) 44107

(*) Notice: Subject to any disclaimer, the term of this patent is extended or adjusted under 35 U.S.C. 154(b) by 0 days.

(21) Appl. No.: 10/026,002

(22) Filed: Dec. 21, 2001

(65) Prior Publication Data

US 2003/0117289 A1 Jun. 26, 2003

(51) Int. Cl.[7] .............................................. G08B 21/00
(52) U.S. Cl. .......................... 340/606; 340/609; 137/1
(58) Field of Search ............................ 340/606, 609, 340/610, 611, 618, 619, 620, 621; 137/486, 487.5, 624.11, 624.12, 1, 613

(56) References Cited

U.S. PATENT DOCUMENTS

| | | |
|---|---|---|
| 4,180,088 A | 12/1979 | Mallett |
| 4,324,268 A * | 4/1982 | Jacobson ..................... 137/312 |
| 4,562,865 A | 1/1986 | Lemkin et al. |
| 4,589,435 A | 5/1986 | Aldrich |
| 4,921,211 A * | 5/1990 | Novak et al. ........... 251/129.04 |
| 5,000,224 A | 3/1991 | Olson, Jr. et al. |
| 5,004,014 A | 4/1991 | Bender |
| 5,062,442 A * | 11/1991 | Stentrom et al. ........... 137/110 |
| 5,086,806 A | 2/1992 | Engler et al. |
| 5,176,320 A | 1/1993 | Kraus et al. |
| 5,893,388 A | 4/1999 | Luker |
| 5,971,011 A | 10/1999 | Price |
| 6,129,103 A * | 10/2000 | Fields et al. .................... 137/1 |

OTHER PUBLICATIONS

Delta Control Products, Inc., *Delta D Series Electric Non-spring Return Actuator*, Technical Bulletin, D Series Literature No. 34–636–836, Rev. B, date unknown, pp. 1–6.
Safe Home Products, *Safety/Emergency Products WaterCop, WaterHound & FreezeHound*, Internet Website, printed on Dec. 10, 2001 at http://safehomeproducts.com/SHP/SM.Water_cop.asp.

* cited by examiner

*Primary Examiner*—Van Trieu
(74) *Attorney, Agent, or Firm*—Fay, Sharpe, Fagan, Minnich & McKee, LLP

(57) ABSTRACT

A water damage protection system and method of preventing water damage for domestic water supply systems is provided. The system comprises a control valve, a sensing device, and a controller. The control valve is bias toward an open position to allow fluid flow therethrough. The control valve is moveable to a closed position upon actuation thereby preventing fluid flow through the conduit. The sensing device detects fluid flow through the fluid conduit. The sensing device sends a fluid flow signal upon detection of fluid flow. The controller receives the fluid flow signal from the sensing device. The controller actuates the control valve when the fluid flow signal occurs continuously for a predetermined length of time and the control valve moves to a closed position.

20 Claims, 1 Drawing Sheet

WATER DAMAGE PROTECTION SYSTEM AND METHOD OF PREVENTING WATER DAMAGE FOR DOMESTIC WATER SUPPLY SYSTEMS

BACKGROUND OF THE INVENTION

1. Field of the Invention

The present invention relates to a fluid control system, and more particularly, to a water shutoff system that automatically shuts off the flow of water when the water flows continuously in excess of a preset period of time. The present invention finds particular application in conjunction with a domestic water supply line from a city source, cistern, well supply or the like to any building and is described herein with particular reference thereto. However, it is to be appreciated that the present invention is also amenable to other applications.

2. Discussion of the Art

Water is generally supplied to a building, such as a house, office building, school, retail store, factory, warehouse, or any other building where a domestic water supply system fitted. Inside the building, several distribution lines provide the water from a water supply line to various water using and/or consuming devices and appliances throughout the building. Excessive water leakage from any of the water lines or water devices can cause extensive damage to the building and its contents, particularly when allowed to accumulate.

Water leaks are caused by a variety of circumstances. One such circumstance is cold weather which can cause water pipes to freeze and/or rupture. Thus, a common problem during cold weather months is bursting water pipes. More specifically, freezing water expands inside the pipes potentially causing a rupture. Further, water pipes tend to become brittle at low temperatures and more subject to failure. Another common problem occurs as a result of deteriorating pipes and/or a failure of fittings, seals, and/or other appliances connected to the water pipes. For example, the distribution water lines within the building, particularly those directly connected to water consumption devices tend to deteriorate over time and burst due to weaknesses caused by such deterioration. Similarly, water consuming appliances are capable of failing and/or bursting thereby causing water leakage. For example, hot water heaters and boilers often fail and cause enormous water damage. Additionally, extraordinary events, such as natural disasters, inclement weather, earthquakes, tornados, hurricanes and the like, may cause water damage. These events are capable of forcefully damaging the water lines directly or through their supporting structures causing potentially severe water leaks. Also, during freezing temperatures, a storm may cause an electrical power service interruption to a building potentially rendering the heating system, if electrical, inoperative. Without heat, the freezing temperatures may cause the water pipes to freeze as described above.

One method of reducing the damaging effect of a water leak is to disable the flow of water into the building. Water supply lines generally include a main shut off valve which allows a homeowner or building manager to shut off the water flowing into the building. In the event of a leak in any of the water lines running throughout the building, the main water shut off valve can be manually closed to prevent additional water from flowing into the building. Additionally, individual water consumption devices and their respective distribution lines often include local manual shut off valves. Although shut off valves are useful in some circumstances, these valves fail to adequately protect the building in many circumstances, such as when the homeowner or building manager is unaware of the water leak and/or away from the building.

Besides water leaks having the potential to cause damage, water leaks also increase the water consumption costs of the building. Typically, a meter on the main water supply line monitors how much water passes into the building. Regardless of how the water is used, a monetary amount corresponding to the amount of water passing into the building is billed by the water supplier. Thus, leaking water resulting from a faucet not completely tightened, for example, will increase the water consumption costs of the building.

Accordingly, it is desirable to provide a water protection, system that reduces the damage caused by water leaks and reduces the amount of water undesirably wasted. The present invention provides a new and improved water protection system for overcoming the above-reference drawbacks and others.

BRIEF SUMMARY OF THE INVENTION

In accordance with the present invention, a water damage protection system and method of preventing water damage for domestic water supply systems is provided.

In accordance with one aspect of the present invention, a method of controlling fluid flow through a conduit is provided. Fluid flow is detected through a conduit. The conduit has a flow control valve for controlling fluid flow through the conduit. The control valve is normally bias toward an open position. Upon detection of flow continuously for more than a preset period of time, the control valve is moved toward a closed position for a first relatively short period of time. After the first relatively short period of time, the control valve is allowed to return to the open position for a second relatively short period of time. Fluid flow is detected through the conduit after the second relatively short period of time. Upon detection of any flow during the step of detecting fluid flow through the conduit after the second relatively short period of time, the valve is moved to the closed position until the control valve is reset to the normal open position.

In accordance with another aspect of the present invention, a fluid flow protection system is provided. The fluid flow protection system comprises a servo motor actuated ball valve operatively connected to a fluid conduit and bias toward an open position to allow fluid through therethrough. The valve is moveable toward a closed position upon actuation thereby preventing fluid flow through the conduit. A sensing device is provided for detecting fluid flow through the fluid conduit. The sensing device sends a fluid flow signal upon detection of fluid flow. A controller for receiving the fluid flow signal from the sensing device is provided. The controller actuates the control valve when the fluid flow signal occurs continuously for a predetermined length of time and the control valve moves to a closed position.

In accordance with another aspect of the present invention, a flow control system is provided. The flow control system comprises a conduit and a flow sensor on the conduit for indicating fluid flow through the conduit. A control valve is provided on the conduit for controlling fluid through the conduit. A controller in communication with the flow sensor and the control valve is provided. The controller is in an initial mode wherein the flow control valve is bias toward an open position. If the flow sensor indicates any flow occurring through the conduit, the controller initiates a time-monitoring mode wherein elapsed time of continuous flow indicated by the flow sensor is compared to a first preset amount of time. If the elapsed time of continuous flow stops and is less than the first preset amount of time, the controller returns to the initial mode. If the elapsed time of continuous flow equals or exceeds the first preset amount of time, the controller initiates an intermediate mode wherein the controller causes actuation of the control valve for a second preset amount of time. Actuation of the control valve moves the control valve to a closed position preventing fluid through the conduit. After the second preset amount of time, the controller allows the control valve to open for a third preset amount of time. The controller initiates a no-flow mode after the third preset amount of time wherein any amount of flow indicated by the flow sensor causes the controller to enter a closed-mode which actuates the control valve until the controller is manually preset to the initial mode. No-flow indicated by the flow sensor in the no-flow mode causes the controller to automatically return to the initial mode.

One advantage of the present invention is the provision of an improved water protection system that reduces the amount of water damage resulting from a water leak in a building.

Another advantage of the present invention is an improved water protection system that reduces the amount of water wasted as a result of a water leak.

A further advantage of the present invention is an improved water protection system that is relatively inexpensive and easy to install.

A still further advantage of the present invention is an improved water protection system that is relatively durable and reliable.

Still other aspects of the invention will be apparent to those skilled in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE INVENTION

Figure 1:
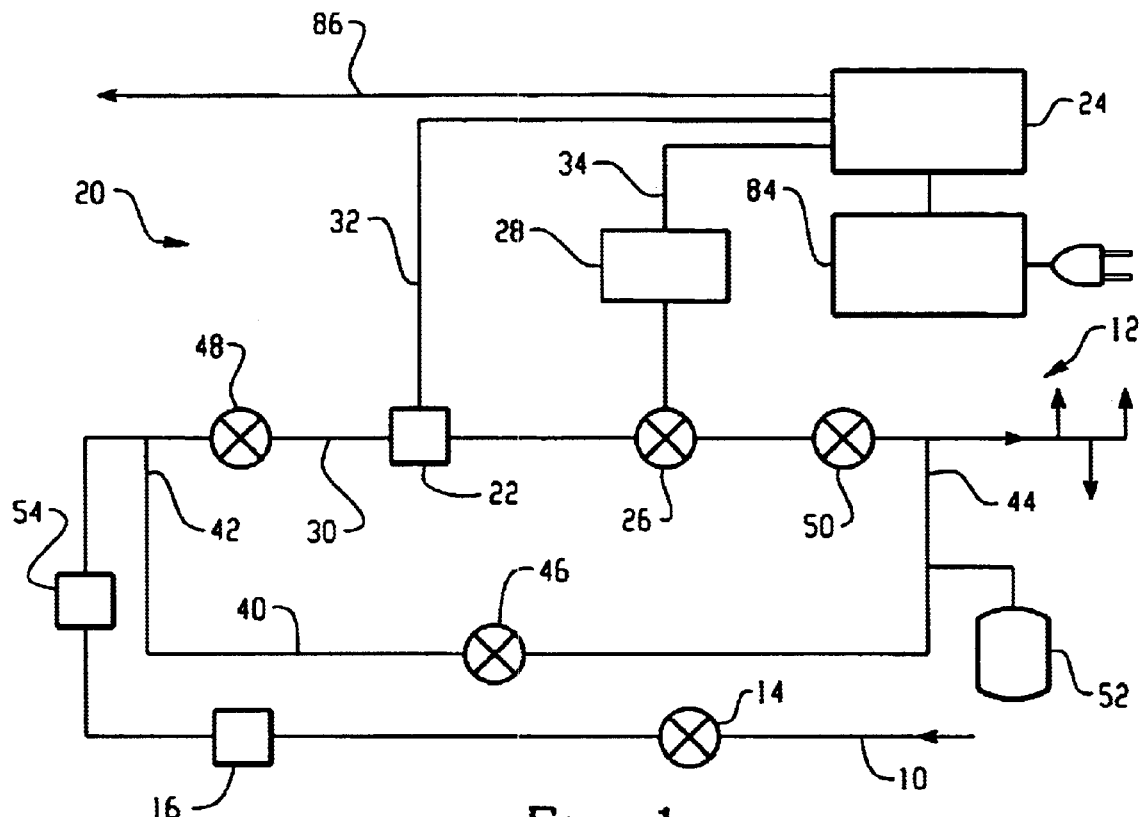
FIG. 1 is a schematic illustration of a water protection system in accordance with the present invention.

With reference to FIG. 1, water is supplied to a building through a water supply line 10. Inside the building, the water supply line 10 branches into various distribution lines 12 to provide water to various water using/consuming devices (not shown) throughout the building. The water supply line 10 may include a main shut off valve 14 for preventing water flow into the entire building. In the event of a leak in any of the water lines 12 running through the building and/or the water devices, the water shut off valve 14 can be manually closed to prevent any more water from entering the building thereby mitigating the damage caused by the leak. A meter 16 measures the volume of water flowing therethrough on the supply line 10. A water supplier uses measurements taken by the water supply meter 16 to determine the appropriate monetary amount to bill the recipient of the water from the supply line 10.

A water protection system 20 comprises a fluid control means, an actuator means, a water flow sensor 22, and a controller 24. In a preferred embodiment, the fluid control means is a control or ball valve 26 and the actuator means is a conventional servo motor actuator 28. However, it is to be appreciated that other fluid control means and actuator means can be employed and all such control means and actuator means are to be considered within the scope of the present invention.

The control valve 26 is operatively mounted along the main water supply line 10 and usually positioned downstream of the manual shut-off valve 14. The control valve 26 is normally bias toward an open position allowing water to flow freely therethrough. However, the control valve 26 is movable toward a closed position upon actuation for preventing water from passing therethrough.

The water flow sensor 22 is a sensing device or means capable of detecting fluid flow through a portion 30 of the main water supply line 10. Upon detecting water flow, the water flow sensor 22 generates a signal representative of positive water flow through the portion 30 of the water supply line 10 and sends this signal to the controller 24 through the signal transfer means 32. The signal transfer means 32 may be any one or more conventional means that are suitable for sending such signals, such as via wire, radio waves, fiber optics, etc. In a preferred embodiment, the controller 24 supplies an electrical signal to the flow sensor 22. If flow is detected, the flow sensor 22 completes an electrical circuit thereby generating the signal representative of positive water flow and the flow sensor 22 returns or sends electrical signal to the controller 24 through a conventional electric transmitting wire.

The controller 24 receives the signal sent from the flow sensor 22. The controller 24 includes an internal timer (not shown) for determining whether the signal representing water flow through the portion 30 of the main supply line 10 occurs continuously for more than a predetermined amount of time. The predetermined amount of time may be determined at the point of manufacture of the controller 24 or may be variably adjustable as will be described in more detail below. The amount of time chosen in either case may depend upon a variety of factors such as the type of building, regular water consumption, etc., or may be entirely an arbitrary amount selected by a homeowner or building manager. As an example, twenty minutes may be deemed appropriate by a homeowner as the predetermined amount of time.

In operation, if the signal from the flow sensor 22 lasts continuously for more than the predetermined amount of time, the controller 24 sends a control signal to the actuator 28 through a second signal transfer means 34. The second signal transfer means 34 may be any one or more of the means described in reference to the first signal transfer means 32. When the actuator 28 receives the control signal, the actuator 28 temporarily moves the control valve 26 toward its closed position to prevent water flow through the portion 30 of the main water supply line 10.

For example, if the timer is set for twenty minutes and the controller 24 receives a continuous signal from the flow sensor 22 in excess of twenty minutes, the controller 24 sends a control signal to the actuator 28 which then closes the control valve 26. However, if there is a break in the signal sent by the flow sensor 22, i.e., the signal is not continuous for at least twenty minutes because the water stopped flowing, the timer in the controller 24 restarts and does not run until the signal from the flow sensor 22 starts again.

When the control valve 26 is first actuated and moved to the closed position, the valve 26 remains closed only temporarily. More specifically, the valve 26 remains closed for a fixed and relatively short period, such as thirty seconds, to allow the user to shut off any faucets or water consuming devices that may have been inadvertently left on and/or open for a period of time in excess of the predetermined amount of time. Thus, temporary closure allows a building occupant a relatively quick and easy chance to remedy the cause of the continuous flow. For example, if a homeowner were to inadvertently leave a faucet running for at least the predetermined amount of time, the system 20 would cause the control valve 26 to close and water would stop running from the faucet. When water ceased to flow from the faucet, the homeowner might realize that he/she inadvertently left the faucet on for too long. Rather than resetting the system 26, the homeowner could simply close the faucet.

After the temporary closure, the control valve 26 then returns to the open position. After a short delay or second relatively short period of time which allows the system to pressurize, the flow sensor 22 again detects whether any flow is occurring. If any flow is still occurring, the controller 24 signals the actuator to again close the control valve 26 until the system is reset manually by the user. If no-flow is detected after the short delay allowing for pressurization, the timer in the controller 18 is automatically reset. Once the timer is reset, the valve 26 again remains open until flow is detected by the flow sensor 22 for more than the predetermined period of time. Thus, the cycle starts over again.

A bypass line 40 fluidly connects to the supply line 10 upstream of the flow sensor 22 at one end 42 and fluidly connects downstream of the control valve 26 at the other end 44. The bypass line 40 includes a bypass valve 46 normally bias toward an open position. The bypass valve 46 allows the bypass line to be used to selectively circumvent the control valve 26. A first isolation valve 48 is positioned on the supply line 10 downstream of the fluid connection between the first end 42 of the bypass line 46 and the supply line and upstream of the flow sensor 22. A second isolation valve 50 is positioned upstream of the control valve 26 and downstream of the fluid connection between the second end 44 of the bypass line 46 and the supply line 10. The isolation valves may be used for isolating the flow sensor 22 and the control valve 26 to facilitate maintenance and repair.

An expansion tank 52 may be used to cushion the system 10 during usage and accommodate fluctuating water temperatures and/or pressures flowing through the system 10. The expansion tank is of the bladder-type in the preferred embodiment but alternative types of expansion tanks may be employed and are considered within the scope of the present invention. In FIG. 1, the expansion tank 52 is shown fluidly connected to the bypass line 40 between the bypass valve 46 and the second end 44 of the bypass line 40. However, the expansion tank 52 may be positioned anywhere in the system 10 to achieve the intended results.

An in-line strainer 54 is optionally positioned downstream from the water meter 16 and upstream of the flow sensor 22 and the control valve 26. The strainer 54 will be used to prevent any foreign objects and/or debris from flowing into the flow sensor 22 and/or the control valve 26.

Figure 2:
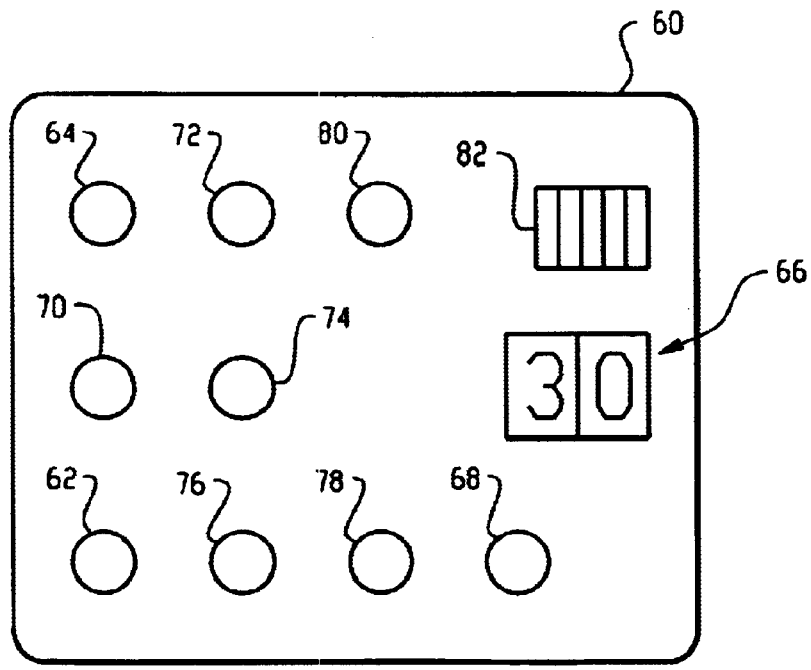
FIG. 2 is a diagrammatic illustration of a controller interface of the water protection system shown in FIG. 1.

With additional reference to FIG. 2, the controller 24 operatively communicates with a controller interface 60. The controller interface 60 may be integral with the controller 24 or may be separate and remotely positioned relative to the controller 24. The controller interface 60 permits a user to make various adjustments to and receive information from the controller 24.

The keypad interface 60 includes a power on/off button 62 operatively connected to a power-on indicator 64. The power-on indicator 64 is an LED in the preferred embodiment but may alternatively be any light source, a mechanical indicator, or other indicator means. The on/off button 62 can be a push button control which will toggle the system 10 between an on-mode wherein power is allowed to fully operate the system 10 and an off-mode wherein at least the actuator 28 is disabled. The power indicator 64 will light up when the system 10 is on. When the system 10 is in the off-mode, flow through the supply line 10 is not obstructed by the control valve 26 because the valve 26 is normally bias toward the open position. Thus, only when the actuator 28 is enabled and sent a control signal, will the control valve 26 stop fluid flow therethrough.

The on/off button 62 may be used as a manual override control which allows the user to deactivate the water protection system 10. Such a control may be useful if the user is engaged in activities that require extended periods of water flow, such as watering a lawn, filling a pool, etc. The user simply presses the on/off button 62 to turn the system 10 off and the water protection system 10 is disabled.

The controller interface 60 also includes a timer control 66,68 that allows a user to manually adjust the predetermined amount of time used by the controller 24. Thus, the user is capable of adjustably choosing how much time water is allowed to flow before the system actuates the control valve 26. More specifically, the timer control 66,68 includes a time select button 68 and a display 66. The button 68 increases the amount of the predetermined amount of time by one minute upon each depression of the button 68. The predetermined amount of time is initially set to zero and cycles back to zero upon an additional actuation after sixty minutes. The display 66 is two eight segment LEDs as in converted in numeric displays. Of course, the timer controller 66, 68 could be alternately configured while still achieving the intended functionally. For example, more buttons may be employed to provide greater control over the adjustability of the timer, such as a reverse button, a reset to zero button, etc.

The controller interface 60 includes a reset button 70 for resetting the controller 24 and the control valve 26 after actuation and permanent closing of the control valve 26. The reset button 70 may be useful after an accidental actuation of the system or after a leak occurs and was subsequently fixed. The reset button 70 causes the control valve 26 to move back to its open position and permits water flow through the main water supply line 10 until water flow again exceeds the predetermined amount of time.

A pair of indicators 72, 74 are disposed on the controller interface 60. The valve open indicator 72 will light whenever the control valve 26 is in the open position and power is supplied to the system 10. The valve closed indicator 74 will light whenever the control valve 26 is in the closed position and power is supplied to the system 10.

A valve closed button 76 is disposed on the keypad interface 60. The valve closed button or panic button 76 is used to toggle the control valve 26 between the open and closed positions. More specifically, the valve closed button 76 can be used to close the control valve 26 remotely and without respect to the timer. The control valve 26, when actuated by the valve closed button 76, will remain closed until the valve closed button 76 is depressed again, toggling the control valve 26 to the open position. When the valve closed button 76 is used to close the control valve 26, the control valve 26 will remain in the closed position even if power is interrupted to the system 10.

A no-flow button 78 and a corresponding no-flow indicator 80 are disposed on the keypad interface 60. When the no-flow button 78 is toggled to an on-mode the no-flow indicator 80 will light. Also, when the no-flow button 78 is toggled to the on-mode the controller 24 will send a signal to the actuator 28 thereby closing the control valve 26 upon the detection of any flow from the flow sensor 22. More specifically, when the no-flow button 78 is engaged, the controller 24 will wait to receive a signal from the flow sensor 22 acknowledging whether any flow is occurring through the flow sensor 22. Upon the detection of any flow, the controller 24 will send a signal to the actuator 28 to close the control valve 26. The no-flow on-mode may be used when immediate protection is required such as when no one is occupying the building. For example, a homeowner may leave on a vacation and wish for the system 10 to protect his home from any leaks. If the homeowner is on vacation, depending on the water devices in the homeowner's home no-flow should occur through the system 10. The homeowner does not want the system 10 to wait until flow time exceeds the predetermined time. Rather, the homeowner wants the system 10 to cause the control valve 26 to close whenever any flow occurs through the flow sensor 22. The no-flow indicator 80 will light whenever the no-flow button 78 is used to put the controller 24 in the no-flow mode.

The water protection system may further include an audible alarm 82 on the controller interface 60. The alarm 82 will sound whenever the flow control valve 26 is closed as a result of flow exceeding the predetermined amount of time. The alarm 82 will continue to sound until the system 10 is reset. Alternatively, the alarm 30 may be remote and located anywhere in the building to alert an occupant that the control valve 26 was actuated.

It is contemplated that additional features may be included in the controller interface 60 and all such features are to be considered within the scope of the present invention. For instance, the controller interface 60 may include a text readable display for showing the current status of the water protection system or how many hours water usage have occurred over a defined period of time. Additionally, the display may show the amount of time elapsed when water is flowing.

With reference back to FIG. 1, the water protection system 10 is powered by a regulated power supply 84 which may be connected to an AC electrical system running through the building. The power supply 84 optionally includes a battery backup (not shown) capable of powering the system 10 in the event of a power failure disabling the electrical system in the building. A low battery indicator (not shown) may be located on the controller interface 60 to alert the user to change the battery or batteries in the battery backup.

The system 10 may also include a gas appliance interface 86. The gas appliance interface 86 may be used to shut down the supply of gas or secure the electric current to a specific gas appliance (not shown). The interface 86 would shut down the gas and/or electric to a water consuming device, such as a gas water heater or boiler, upon closure of the control valve 26 to prevent continued heating by the gas appliance without access to water from the supply line 10. More specifically, if the control valve 26 is closed, no water could flow into the building. An appliance such as a boiler or water heater could be potentially dangerous without water and is better off being disabled.

The invention has been described with reference to the preferred embodiments. Obviously, modifications and alterations will occur to others upon reading and understanding the preceding detailed description. It is intended that the invention be construed as including all such modifications and alterations insofar as they are within the scope of the appended claims or the equivalents thereof.

Having thus described the preferred embodiments, the invention is now claimed to be:

1. A method of controlling fluid flow through a conduit, comprising the steps of:

detecting fluid flow through a conduit, the conduit having a flow control valve for controlling fluid flow through the conduit, the control valve normally bias toward an open position;

upon detection of flow continuously for more than a preset period of time, moving the control valve toward a closed position for a first relatively short period of time that is less than the preset period of time;

after the first relatively short period of time, allowing the control valve to return to the open position for a second relatively short period of time that is less than the preset period of time;

detecting fluid flow through the conduit after the second relatively short period of time;

upon detection of any flow during the step of detecting fluid flow through the conduit after the second relatively short period of time, moving the valve to the closed position until the control valve is reset to the normal open position.

2. The method as set forth in claim 1 wherein the first relatively short period of time is sufficient to allow manual shutoff of flow through the conduit by a downstream valve fluidly connected to the conduit.

3. The method as set forth in claim 2 wherein the first relatively short period of time is thirty seconds.

4. The method as set forth in claim 1 wherein the second relatively short period of time is approximately a maximum amount of time required for the conduit to pressurize.

5. The method as set forth in claim 1 wherein the step of moving the control valve to the closed position upon detection of any flow until the control valve is reset to the normal open position further includes:

sounding an audible alarm to indicate that the control valve is closed and will not open until reset.

6. The method as set forth in claim 1 wherein the step of moving the control valve to the closed position upon detection of any flow until the control valve is reset to the normal open position further includes:

providing an illuminated indicator to indicate that the control valve is closed and will not open until reset.

7. The method as set forth in claim 1 further comprising the step of:

selectively and manually choosing the preset period of time.

8. The method as set forth in claim 1 further comprising the steps of:

providing a flow sensor for detecting fluid flow through the conduit;

sending a flow signal from the flow sensor indicating that flow is occurring in the conduit;

providing a controller for receiving the flow signal and determining whether to send an actuation signal;

sending the actuation signal from the controller if the controller determines to send the actuation signal;

providing an actuator for receiving the actuation signal and for moving the control valve to the closed position.

9. A fluid flow protection system comprising:

a control valve operatively connected to a fluid conduit and biased toward an open position to allow fluid flow therethrough, the valve movable between the open position and a closed position wherein fluid flow through the fluid conduit is prevented;

a sensing device for detecting fluid flow through the fluid conduit, the sensing device sending a fluid flow signal upon detection of fluid flow; and a controller for receiving the fluid flow signal from the sensing device, the controller (1) moves the control valve to the closed position when the fluid flow signal occurs continuously for a predetermined length of time, (2) moves the control valve to the open position shortly after closing the control valve and (3) moves the control valve to the closed position if the fluid flow signal is received shortly after the control valve reopens the control valve.

10. The fluid protection system as set forth in claim 9 wherein the controller comprises an adjustable timer for allowing manual setting of the predetermined length of time.

11. The fluid protection system as set forth in claim 9 wherein the controller comprises an on/off control for deactivating the system.

12. The fluid protection system as set forth in claim 9 further comprising:

a power source for operating at least one of said control valve, the flow sensor, and said controller.

13. The fluid protection system as set forth in claim 9 wherein the power source includes a battery backup.

14. The fluid protection system as set forth in claim 9 further comprising:

an alarm activated by the controller upon actuation of the control valve.

15. The fluid protection system as set forth in claim 9 wherein the controller includes an override control for moving the control valve to the closed position regardless of whether flow is occurring in the conduit.

16. A fluid protection system comprising:

a valve operatively connected to a fluid conduit and biased toward an open position to allow fluid flow therethrough, the valve movable toward a closed position upon actuation thereby preventing fluid flow through the fluid conduit;

a sensing device for detecting fluid flow through the fluid conduit, the sensing device sending a fluid flow signal upon detection of fluid flow;

a controller for receiving the fluid flow signal from the sensing device, the controller actuates the control valve when the fluid flow signal occurs continuously for a predetermined length of time and the control valve moves to a closed position; and an interface for disengaging at least one of a gas source and an electrical source upon actuation of the control valve.

17. A flow control system, comprising:

a conduit;

a flow sensor on the conduit for indicating fluid flow through the conduit;

a control valve on the conduit for controlling fluid flow through the conduit;

a controller in communication with the flow sensor and the control valve, the controller in an initial mode wherein the flow control valve is bias toward an open position, if the flow sensor indicates any flow occurring through the conduit the controller initiates a time-monitoring mode wherein elapsed time of continuous flow indicated by the flow sensor is compared to a first preset amount of time, if the elapsed time of continuous flow stops and is less than the first preset amount of time the controller returns to the initial mode, if the elapsed time of continuous flow equals or exceeds the first preset amount of time the controller initiates an intermediate mode wherein the controller causes actuation of the control valve for a second preset amount of time, actuation of the control valve moves the control valve to a closed position preventing fluid flow through the conduit, after the second preset amount of time the controller allows the control valve to open for a third preset amount of time, the controller initiates a no-flow mode after the third preset amount of time wherein any amount of flow indicated by the flow sensor causes the controller to enter a closed mode which actuates the control valve until the controller is manually reset to the initial mode, no-flow indicated by the flow sensor in the no-flow mode causes the controller to automatically return to the initial mode.

18. The flow control system as set forth in claim 17 wherein the controller comprises a reset control which upon actuation returns the controller to the initial mode.

19. The flow control system as set forth in claim 17 wherein the controller comprises a control valve close button which upon actuation initiates the closed mode.

20. The flow control system as set forth in claim 17 wherein the controller comprises a no-flow button which upon actuation initiates and maintains the controller in the no-flow mode unless and until the controller enters the closed mode.

* * * * *